Figure 4:
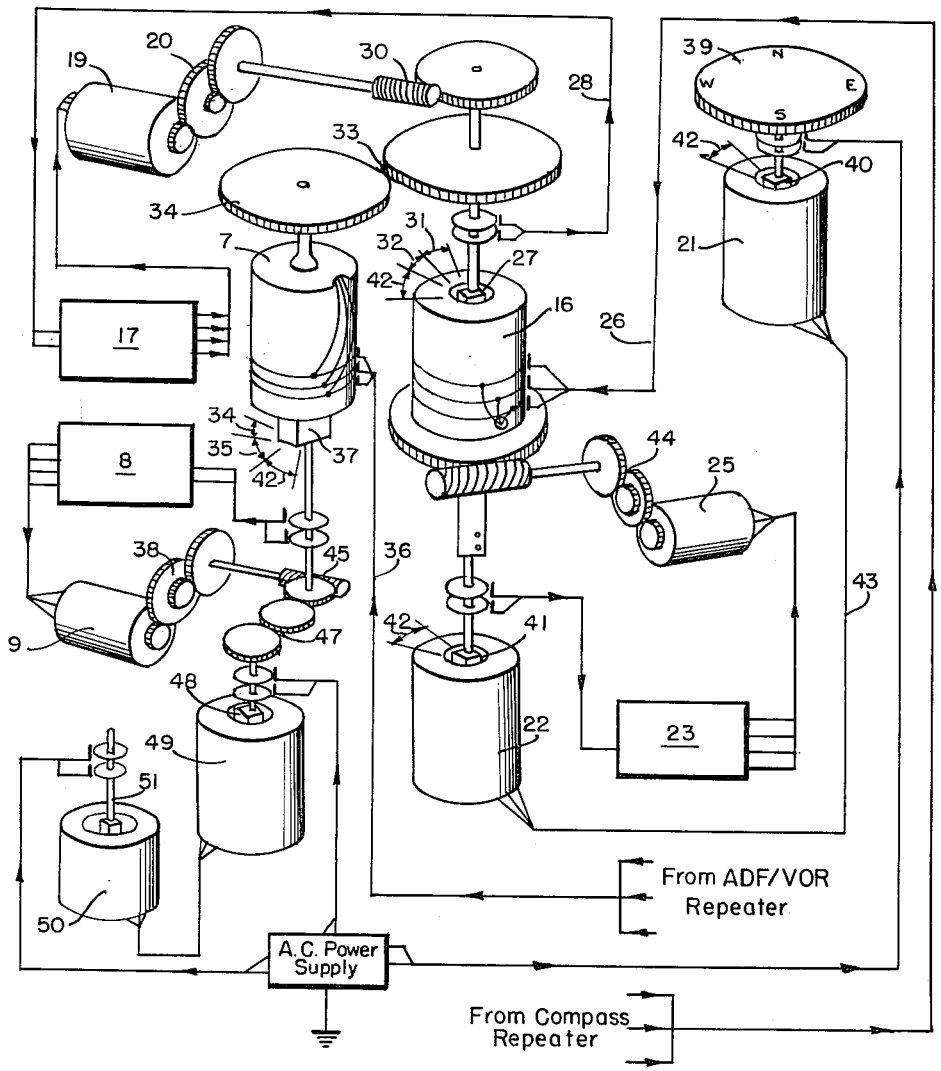

June 9, 1964 M. C. FERNANDEZ 3,136,998
AUXILIARY SYSTEM FOR BLIND FLYING BY RADIO
Filed Feb. 4, 1960 3 Sheets-Sheet 1
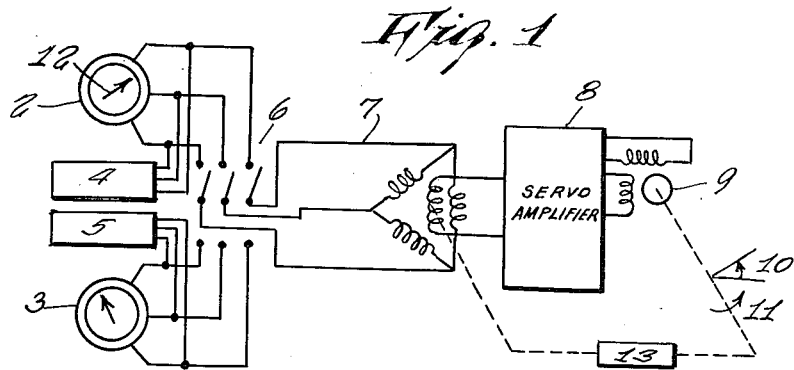
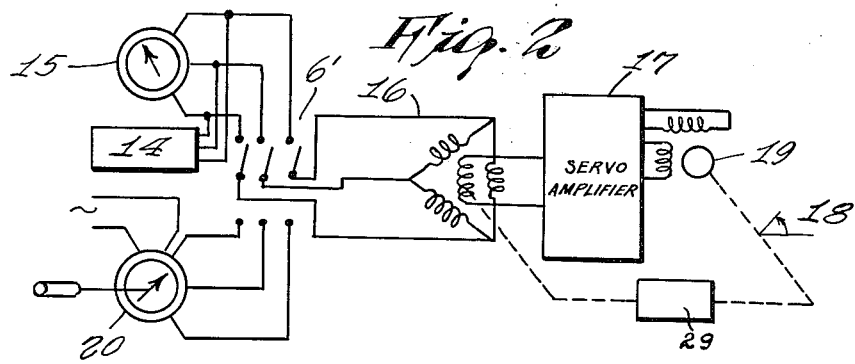
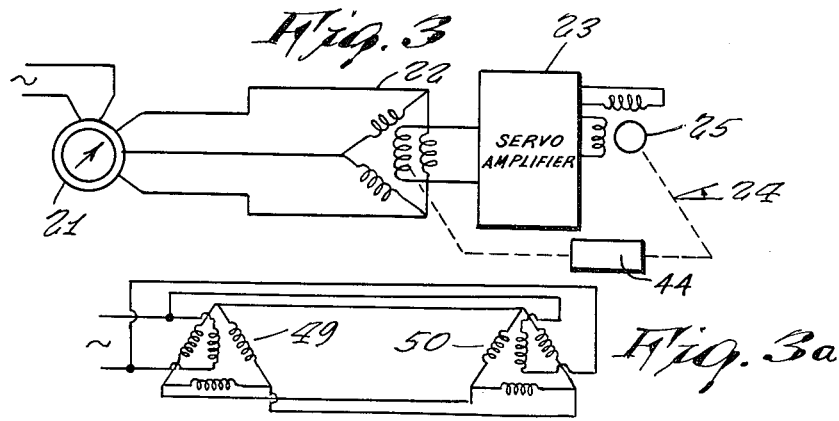
INVENTOR.
MANUEL CASTRO FERNANDEZ
BY
ATTORNEY

INVENTOR.
MANUEL CASTRO FERNANDEZ

United States Patent Office 3,136,998
Patented June 9, 1964

3,136,998
AUXILIARY SYSTEM FOR BLIND FLYING BY RADIO
Manuel Castro Fernandez, Canillejas, Calle Alameda 8, Madrid, Spain, assignor of fifty percent to Carlos C. Goetz, Lisbon, Portugal
Filed Feb. 4, 1960, Ser. No. 6,694
Claims priority, application Spain Feb. 19, 1959
14 Claims. (Cl. 343—112)

Today, highly efficient systems are in common use for night landings of planes or when visibility is poor. These guide the planes with almost absolute precision and from considerable distances toward landing strips indicating that the plane's position in the air is within the approach path. These systems are, however, not sufficiently comprehensive as they fail to keep the pilot informed in a safe constant and simple manner of the plane's distance from the head of the field or its exact position on the approach path.

At the time of landing the pilot must always know his exact position in the air so that he can determine how to land properly and be able to execute whatever maneuvers are necessary with the highest precision and in split-second timing.

Today, the extremely high speeds at which planes travel make exact position-finding an absolute necessity.

To solve this problem, a system covered by this application for patent has been devised. It consists of a control box, a unit of servo amplifiers and an auxiliary indicator for blind landing, to which signals are transmitted emanating from inboard automatic radiogoniometers, or from very high frequency equipment commonly referred to as VOR. These signals, when they have been transformed, become optical or mechanical indicators of the QTE, or lines of geographical position, which originate in the point occupied by the radio beacon in use, and which figure in the map which for this purpose is mounted in front of the blind landing indicator. If the plane is in the approach path, known in aeronautical terminology as QMS, and normally indicated in these instruments by a needle centered in the upper part and which remains always in a vertical position, the position of the plane will be shown on the map at the point of intersection of this line of geographical position, or QTE, and the aforementioned vertical needle in the instrument for blind landing.

The following description contains details of the system that is used for, one, to transform the signal taken from the automatic radiogoniometers into QTE, or geographical line indications; and, two, to make this indication establish its origin at any point on a circle on the map on which the radio beacon being used is established.

The accompanying drawings will show in a general way how the system functions. This system receives a signal taken from an automatic radiogoniometer, known generally as ADF equipment if it is American made, or from a very high frequency equipment, known as VOR if it, also, is American made, or from similar equipment produced in any other country, and a directional signal emanating from an electronic compass, or from a manual system if this is not available.

Figure 5:
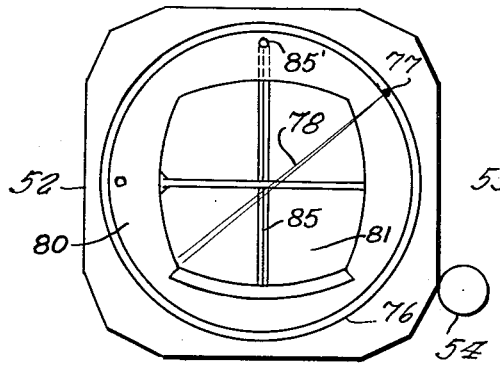
Figure 6:
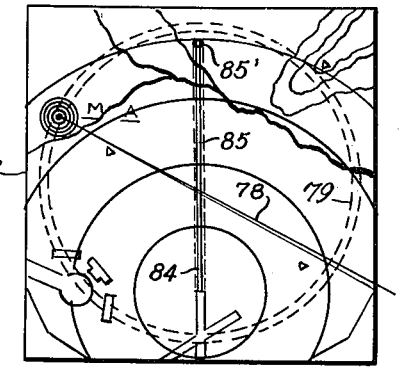
Figure 8:
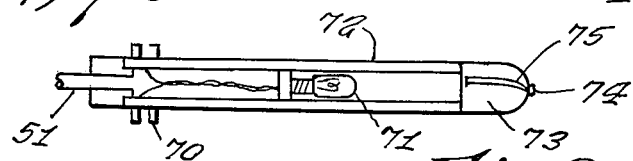
Figure 7:
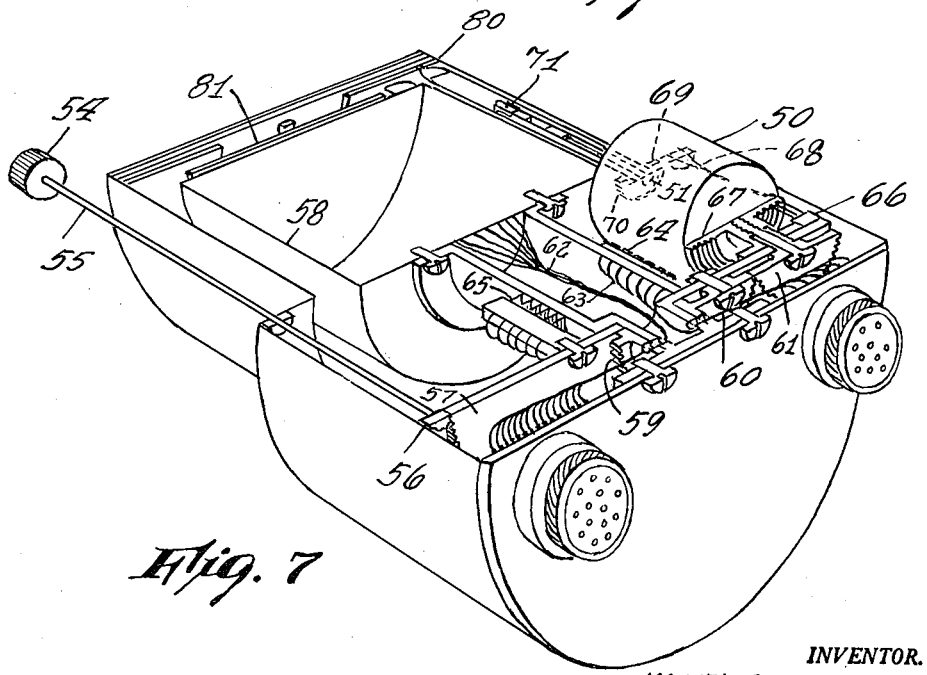

In the drawing, FIGURE 1 is a circuit diagram of the present system; FIG. 2 is a circuit diagram of the present system modified for use with an electronic compass; FIG. 3 is a circuit digaram of a supplemental system to correct magnetic declination; FIG. 3a is a circuit diagram of the instrument for producing the summation of the angles; FIG. 4 is a diagrammatic view of the mechanism and wiring which adds the bearing angle to the magnetic direction and declination and orientation of the map; FIG. 5 is a front face view of the approach indicator; FIG. 6 is a plan view of the map covering the zone of entry; FIG. 7 is a fragmentary perspective view of the blind flight indicator cut away at the center to show the interior thereof; and FIG. 8 is a side elevational view of a luminous beam light used in the blind flight indicator.

FIG. 1 shows synchronous repeaters 2 and 3, which respond respectively to a radiocompass or automatic radiogoniometer known as ADF 4, or to the VOR system 5 previously referred to, from which electrical impulses are received by the stators. A triple pole switch 6 is connected to the stator of a repeater 7, which is energized through the signal emanating from the ADF system 4, or the VOR 5, depending on the position of switch 6. The rotor 37 (see FIG. 4) of the repeater is connected to the input of the amplifier 8 of the servo mechanism which turns the motor 9 in such a way that it will swing as indicated at 10 from a point of reference 11 of the motor housing itself equal to the indication or bearing 12, shown by the radiogoniometer or VOR with respect to the nose of the airplane or ship. Like all servo mechanisms the motor 9 is hooked up, in this case, mechanically, and with the angle or rotation of the rotor of the repeater 7, to provide the system, by means of the gears 38, with the energy needed by the servo mechanism. This servo mechanism receives signals from either the ADF or the VOR which previously were synchronized or tuned with the frequency of the radio beacon station used and that is shown on the map.

If the nose of the plane or ship should point to the north, the magnetic declination being zero, the angle 10, described by the motor 9 of the servo mechanism, minus 180° would be equal to the QTE of the syntonized radio station or the direction of the radio beacon from the aircraft.

When the nose does not point to the north, because of some magnetic heading or because some magnetic declination exists, it will be necessary to add the sum of these two angles to the angle formed by the line of propagation of the electro-magnetic wave between the station that has been tuned in and the line running from nose to tail, or bearing, and these sums of the magnetic heading with the bearing given by the radiogoniometer may be obtained automatically if the plane has an electronic compass 14 (FIGURE 2) of any of the existing types which operate a synchro-repeater motor 15 similar to those used in the automatic radiogoniometers or in the VOR equipment. For this purpose, electrical energy is tapped from the stator of the synchronous-repeater motor 15 of the magnetic direction and is carried to a servo amplifier system 16 and 17 identical with the one used with the radiogoniometer or the VOR previously described in FIGURE 1. The angle 18 described by the motor 19 of the servo corresponding to the electronic compass 14 is added by means of gears, to be described further on, with the angle 10 or the bearing given by the servo motor 9 the function of which is to obtain the necessary bearing to fix the position of the ship.

In the craft does not have an electronic compass 14 (FIGURE 2), the rotor of a synchro motor 20, autosyn or selsyn, may be controlled manually, and if the signal has been suitably amplified by means of the servos 16 and 17, the angle 18 of its motor 19 will be produced and therefore the sum of said angle 18 with the bearing 10 of the other motor 15 will produce the necessary angle for determining the position.

If the map on the indicator shows a northerly direction toward the upper part of the indicator, and if there is no magnetic declination in the area where the plane is flying, it will not be necessary to make an adjustment of the angle or QTE given by the needle or luminous beam of the indicator; however, if, as often happens, maps are used in which the northerly direction does not coincide with the upper part of the indicator, or if magnetic declination exists in the area of flight, it will be necessary to make a correction by adding a supplementary angle identical to that which the northerly direction of the map forms with the vertical direction of the indicator, adding to, or subtracting from, this angle the sum in degrees of the magnetic declination of the flight area.

This correction is effected by manual operation of the rotor of a synchro motor 21 (FIGURE 3), autosyn or selsyn, which energizes the stator of another repeater 22. If the signal of the rotor 41 (see FIG. 4) is suitably amplified by means of the servo mechanism 23, corresponding to it, the angle 24 of its motor 25 will be produced, and therefore the sum of angle 24, with the angle 18 of the motor 19, and, consequently, the angle 10 of the motor 9 will vary, and the angle necessary for determining the position will thus be obtained.

In FIG. 4 is shown the mechanism which adds the angle of the bearing with the magnetic heading, as well as with the magnetic declination and the orientation of the map or chart.

The three connections 26, which are obtained by tapping the repeater 15 (FIGURE 2) of the compass 14 (FIGURE 2), energize the three coils of stator 16 (FIGURE 4) through the necessary collector rings and brushes, provided this stator 16 can be turned. When the magnetic heading is zero, the map is oriented toward the north, and no declination exists, this stator 16 will have a properly determined position, and its rotor 27 will then be adequately oriented, as its induced voltage or the indication of error denoted by the corresponding servo mechanism will pass through the connections 28, energizing the corresponding amplifier 17, moving the motor 19, and through the reducing gears 29 and at 30 correcting the orientation of the rotor 27, until it is properly oriented according to the direction 31 of the field produced by the currents which pass through the conductors and brushes 26 of the repeater of the electronic compass, in the interior of the repeater 16. Thus the rotor 27 will line up with the zero direction 31 of stator 16.

When the compass shows a magnetic heading other than zero, the field in the interior of the stator 16 will turn at an angle 32 with respect to this stator, voltage is induced in its corresponding rotor 27 current of a specific phase and amplitude is induced through the conductors 28, which is then amplified by means of the corresponding amplifier 17 turning the motor 19, until the rotor 27 is lined up in such a way that it no longer has any induced voltage by means of an angle identical to that at 32, owing to a graduation of the magnetic heading.

The rotation 32 produced in the rotor 27 is transmitted through the gears 33 to the stator of another selsyn repeater motor 7 in such a way that the angle or rotation 34 gives the same number of degrees and therefore the angle 35, which the magnetic field forms with the zero or reference direction of stator 7, because of the currents which it receives through the brushes 36, originating from the repeater of an automatic radiogoniometer or a VOR receiver, is supplied by this angle or rotation 34, of stator 7. This results in an induced voltage in the rotor 37 which is carried to the amplifier 8, and from it to the motor 9, which in turn and by means of the gear 38, corrects the orientation of the rotor at an angle equal to that at 34; that is, until it is again possible to achieve a balance of zero induced voltage on the rotor 37. In this way the magnetic headings 32 and 34 are added to the bearings or angles 35 which the motor 37 has with respect to its stator 7. Owing to the rotation of the stator 7 of the motor, it is necessary that the electrical connections be made by means of suitable ring-shaped contacts and brushes 36.

The sum of the angles of orientation of the map or chart, as well as the magnetic declination, is obtained by means of a selsyn motor, the rotor 40 of which is connected to a suitable source of alternating current, and its stator, 21, connected through a cable 43 to the stator 22, of another synchronous repeater motor, the rotor of which is shown at 41. Both this synchronous motor and its repeater have a fixed position for their stators, and for the motors a position determined for zero values of orientation respecting the map and the magnetic declination.

If an angle of rotation 42 is produced in the rotor 40, by means of a control with a graduated scale 39 equal in degrees to the orientation of the map being used, plus or minus the magnetic declination of the locality, an induced voltage is produced in the rotor 41 which, when it is transmitted to the amplifier 23 energizes the motor 25, and this in turn and by means of the gears 44 corrects the orientation of the rotor 41 at an angle equal to that at 42, until once again it is possible to achieve a balanced situation of zero induced voltage at rotor 41. The rotor 41 and the stator 16 are joined mechanically so that the variation 42 of the stator 16 forces the rotor 27 to find again its zero position, energizing the servo mechanism 17 which feeds the motor 19 which, by means of gears 29 and 30 move the rotor 27 an angle 42 equal to the orientation of the map plus or minus the magnetic declination. This variation of the rotor 27 by means of the gears 33 is transmitted to the stator 7 and therefore its rotor 37 is put off balance and a voltage is produced which, when transmitted to the amplifier 8, rotates the motor 9. The motor 9 through a series of reducing gears 38 and a worm gear 45 transmits its movement through sprocket wheel 46 to the rotor 37 without stopping until rotor 37 is lined up with the field which the stator of its repeater motor 7 has produced, and it shall then have an orientation, as previously described, equal to the sum of the magnetic heading, the bearing, the magnetic declination and the correction of the map; this same rotation is transmitted by means of the gears 47 to the rotor 48 of a synchronous motor 49, which is mounted in parallel fashion with the synchronous repeater motor 50, the rotor of which 51, FIGS. 3a and 4, will reproduce these angle sums or QTE in the indicator.

FIGS. 5 to 8 give some idea of the mechanism of the indicator and the manner in which this result may be shown on a map. On the front of an instrument, 52, FIGURE 5, is shown the approach indicator used in blind flying, and a map 53 is placed on it (FIGURE 6) covering the zone of entry.

This chart or map 53 should be transparent in order that the needles of the blind flight indicator may be seen, as well as the luminous beams or lines that might be applied to its lower part. The location of this map 53 (FIGURE 6) on the front of the indicator must be made in such a way that the landing strip to be used will be indicated in the upper or lower portion of the center of the map, and in such a way that the needle 85 used for indicating deviations shall coincide exactly in its position, at the center, with the zone of entry, or QMS, indicated on the map.

A knurled knob 54 (FIGURES 5 and 7), through shaft 55 sets the sprocket wheel 56 in motion, thus activating the toothed plate 57, which once in motion forces the synchronous repeater motor 50 to effect a transfer movement, describing a circle around the blind flight indicator 58, which remains fixed to the whole unit. The gear wheel 59, which also is attached to the unit, forces the intermediate gear wheel 60 to turn when the toothed plate 57 is turned, pulling the gear wheel 61, which being joined to the selsyn repeater motor 50 makes this motor rotate simultaneously with the transfer motor, and thus, regardless of the position of this motor 50, it will keep its true line, or reference, which could be from north to south, in a parallel position to the up and down line of the blind flight indicator.

The connections 62 of the blind flight indicator are carried directly to this instrument, since the entire structure of this indicator is in a fixed position, but the connections 63, necessary to the functioning of the repeater selsyn motor 50, are hooked up to a system of collector rings 64, and by means of their corresponding brushes 65 to another system of brushes 66, which transmit electric current to the collector 67 situated in the lower part of the repeater synchronous motor 50. The electrical part of this synchronous motor 50 is hooked up to this collector 67 and also wires 68, which through the brushes 69 and collector rings 70 provide current for a small bulb 71 of a beam light unit 72, FIG. 8.

This unit 72 (FIGURE 8) is mounted on the shaft 51 of the repeater synchronous motor 50 on the lower outside surface of which the collectors 70 are attached and inside of which the small bulb 71 is contained. On the upper end part is a shield 73 with a crystal lens 74 mounted in the upper central portion and which has a slot 75 so that a colored light point 77 (FIGURE 5) is produced on an opalescent glass 80 and 81 (FIGURE 7) and a luminous beam 78 (FIG. 5) when the slot is in front of the indicating system of the blind flight instrument.

The map 53 should be made in such manner that the geographical situation of a broadcasting station which could provide directional information, or a QTE line, is placed at the point corresponding to the circumference described for the transfer of the repeater synchronous motor (50, FIG. 7), around the blind flight indicator 58, and the turning point of whose rotor shaft 51 is indicated by the colored light 77 (FIGURE 5), and which therefore is the origin of this location indicating line.

By means of the mechanical systems that have been described, it is possible to make the colored light 77 coincide with the location of any broadcasting station that may appear in this circle. In the case of the map 53, FIGURE 6, MA is the reference station and, for greater accuracy, it is indicated between the circles 79, and the position of flight will be shown where the line of geographical position originating from the station MA crosses the line of entry 84, or path of entry, when the needle 85 of the blind flying instrument indicates that this position of flight is within this entry path 84.

In FIG. 6, it is indicated that the vertical needle 85 swings around an upper pointer 85' to show any deviation of hte craft from its entry path 84. This needle 85 is in a naturally vertical position when the craft flies directly and within the line of path 84. The needle 85 will swing to the right or left when the craft is outside the entry path.

I claim:

1. An auxiliary aircraft blind landing system comprising a position indicator responsive to signals along a flight path and provided by a radio location receiver of a landing system, and geographic line indication means of the aircraft referring to a land-based radio beacon, the coordinates of said geographic line indication means being respectively obtained from airborne navigation instruments, and operable with the signals of the indicator to display the position of the aircraft.

2. An auxiliary aircraft blind landing system as defined in claim 1, said indicator having a location needle swingable over the face thereof, said needle being moved by the receiver, said indicator having a translucent map of the letdown area with an approach path thereon, this approach path being superimposed on the location needle when the aircraft is flying into the approach path, the geographic line indication means including a beam light unit bar projecting a light beam through the position of the aircraft on the map and intersecting the approach path.

3. An auxiliary aircraft blind landing system as defined in claim 2, and means for adjusting the light beam as to its geographic position line and point of origin of this geographic position line on the map including a selsyn repeater rotatable around the indicator face, whereby the point of origin of the geographic position line can be made to coincide with any position occupied on that map by a land-based transmitter beacon.

4. An auxiliary aircraft blind landing system as defined in claim 3, and said selsyn repeater having a double light projection system, emitting one beam vertical to the rotation axis with reference to the point of origin of the geographic position line and another beam perpendicular to that same rotation axis for producing the geographic position line.

5. An auxiliary aircraft blind landing system as defined in claim 3, and indicating means on the rotation axis of the selsyn repeater perpendicular thereto to indicate the geographic position.

6. An auxiliary aircraft blind landing system as defined in claim 3 and said map located on the face of the indicator being drawn to a predetermined scale so that the point indicating the position of the land-based transmitter from which to get the geographic position line, precisely coincides with a point on the circle described on the map by the system for producing the point of origin of this geographic position line, said map being so placed on the face of the indicator that the approach path, marked on the map, remains parallel to and superposed on the point occupied on the indicator by the location needle when the aircraft is precisely within the let down approach path.

7. An auxiliary aircraft blind landing system as defined by claim 6, and said geographic map showing the approach path with distance markers, runways, obstacles and the like data as well as the beacon radio station on the ground.

8. An auxiliary aircraft blind landing system as defined in claim 3, and said geographic position line, angle values being supplied by an airborne navigation instrument, the angle values of the "bearing" of the aircraft being supplied by a compass system direction-finding system, and angle values for the inclination of the North-South line on the map being with respect to the Top-Bottom line of the indicator and the magnetic declination, and servo mechanisms for rotating the stators and rotors of the selsyn repeater motor, said angular values are either added or subtracted and their final value being determined by the position of the rotor of a selsyn repeater with respect to its stator.

9. An auxiliary aircraft blind landing system as defined by claim 8, and a servo mechanism for transferring the value of the "heading" of the aircraft to the rotor of the first selsyn repeater motor whose stator changes its zero reference position in accordance with the angle value for the correction of the inclination of the map, a second selsyn or repeater whose rotor is mechanically joined to the stator of the first selsyn repeator to cause the rotor of the first repeater to turn again to find its new point of equilibrium, further servo mechanism for applying the magnetic declination to the second selsyn repeater, a third selsyn motor which for reproducing the value of the "relative heading" taken from an airborne navigation receiver and still further servo mechanism for operating the same, and a fourth selsyn motor having a fixed stator and connector to the rotor of the third selsyn motor for finally reflecting the angular value of the geographic position line.

10. An auxiliary aircraft blind landing system as defined by claim 2, and VOR type of similar high-frequency navigation set for supplying the angle values of the bearing to obtain the geographic position line and the angle values for the inclination of the North-South line on the map with respect to the Top-Bottom line on the indicator, and the magnetic declination, being effected by electromechanical systems, said angle values being either added or subtracted and their final value being determined by the position of the rotor of a Selsyn master motor to its fixed stator.

11. An auxiliary aircraft blind landing system as defined by claim 10, and servo mechanism for moving the rotor of the first Selsyn to its zero reference position, said first Selsyn having a stator that changes its reference position in accordance with the angle value for the correction of the inclination of the map, plus magnetic declination, a second Selsyn motor having a rotor mechanically joined to the stator of the first motor, and servo mechanism for operating the second motor, said rotor of the first motor turning in order to find its new point of equilibrium, a third Selsyn motor having its stator turned by the rotor of the second motor and its rotor, servo mechanism for operating the third motor, the rotor of the third motor reproducing the value for the "bearing" taken from a high-frequency navigation set, and a fourth Selsyn master motor having a fixed stator and its rotor rotated by the rotor of the third motor, and the angle position of this fourth rotor reflecting the value of the geographic position line.

12. An auxiliary aircraft blind landing system as defined in claim 11, and the rotation of said last named third motor rotor being equal to the angle formed on the map by the geographic meridian passing over the spot designating the location of the ground station radio with a line connecting the position of the aircraft and a radio beacon, gears for transmitting said angle to the rotor of a fourth synchronous motor having a stationary stator, and another synchronous repeater motor installed in said indicator and electrically connected in parallel with the fourth synchronous motor and in whose rotor the angular movements of said fourth synchronous motor are reproduced to mechanically rotate the luminous beam projector.

13. An auxiliary aircraft blind landing system as defined in claim 12, and the fourth synchronous repeater motor of the geographic position line and of the rotation movement around the indicator, being obtained by a tapped control in front of and to the right of the indicator to perform another translation movement on its axis to determine its reference line and to maintain a position which at any moment is similar to the reference line or of the indicator.

14. An auxiliary aircraft blind landing system as defined in claim 13, and a servo mechanism for controlling the repeater motor of the geographic position line by means of moving the indicator systems at the same angle value.

References Cited in the file of this patent
UNITED STATES PATENTS

| | | |
|---|---|---|
| 2,361,956 | Moseley | Nov. 7, 1944 |
| 2,393,337 | Phillips | Jan. 22, 1946 |
| 2,482,105 | Duggar | Sept. 20, 1949 |
| 2,485,663 | Rusch et al. | Oct. 25, 1949 |